UNITED STATES PATENT OFFICE 2,511,740

STABILIZED THIXOTROPIC GELS

Herman J. Schneiderwirth, Jenkintown, Pa., assignor to Sharp & Dohme, Incorporated, Philadelphia, Pa., a corporation of Maryland No Drawing. Application October 5, 1949, Serial No. 119,759

3 Claims. (Cl. 252—317)

This invention is concerned with gels of water insoluble salts of alkaline earth metals colloidally dispersed in an aqueous medium, which are made thixotropic by the addition of a water soluble citrate. The thixotropic gels of this invention have a rigid consistency when at rest and after brief shaking or stirring become fluid and pourable in the form of a liquid, stable, homogeneous dispersion or suspension, and the transformation from the rigid form to the liquid form is reversible and may be carried on from one form to the other without limit.

Thixotropic gels have a wide field of application and are useful in a number of industrial arts as in colors, and pigments and paints, paper and paper coating, leather finishing, and others. They also are particularly useful in the pharmaceutical industry in compounding various types of pharmaceutical and therapeutic preparations.

Thixotropic gels of the type of this invention, in which the colloidally dispersible, water insoluble, alkaline earth metal salt and the citrate of the alkaline-reacting agent are the sole constituents contributing the thixotropic property, are described in United States patent application Serial No. 621,382, filed October 9, 1945, now Patent No. 2,487,600, issued November 8, 1949, of which this application is in part a continuation. Such gels manifest thixotropy best when the hydrogen ion concentration of the system is between about pH 5.0 and 6.5.

A feature of this invention is the use of certain materials to extend this pH range, including both the acid and alkaline sides, over which thixotropic behavior can be manifested. Materials suitable for this purpose, called pH range extenders, are selected from the water soluble carbohydrates and the hexahydric alcohols, also known as sugar alcohols, particularly the hexitols. Any of the carbohydrates, whether a monosaccharide, advantageously having the general formula $C_6H_{12}O_6$, or a di-saccharide, advantageously having the general formula $C_{12}H_{24}O_{12}$, is suitable so long as it is water soluble, for example, monosaccharides such as glucose (dextrose), mannose, fructose (levulose), galactose, or disaccharides as lactose, maltose, and sucrose. Of the water soluble, hexahydric alcohols, especially suitable are those that have a straight chain of six carbon atoms and six hydroxy groups, particularly sorbitol, mannitol, and dulcitol. The addition of a minor portion of one or more pH range extender to a thixotropic gel system extends the hydrogen ion concentration range at which good thixotropy is present to from about pH 3.5 to about 11.0.

The practical advantage of maintaining thixotropy at a pH between 3.5 and 11 is illustrated as follows:

(1) When a thixotropic mineral gel containing vitamins of the so called vitamin B complex is prepared, the pH must be kept preferably between 4.0 and 5.0 in order to prevent gradual decomposition of the vitamins. Thiamine hydrochloride, also called vitamin $B_1$, and ascorbic acid, also called vitamin C, are examples of vitamins requiring a pH between 4.0 and 5.0 to prevent their decomposition. It is known, however, that most preparations containing one or more vitamins of the B complex and/or vitamin C show optimum stability at pH 4.5.

(2) When it is desired to prepare a thixotropic mineral gel to which water soluble sulfanilamide derivatives are to be added, such as sodium sulfadiazine and sodium sulfapyridine, the pH of the gel must be adjusted to between approximately 9 to 10 in order that these compounds will stay in solution.

There are many other therapeutic agents which when carried by the thixotropic gels, demand a pH above 6.5 or below 5.0, for optimum therapeutic action as well as for stability. When such cases arise, the described pH range extenders are imperative.

From this it can be seen that with the use of the pH range extenders it is possible to prepare a gel having optimum thixotropic characteristics under the acid conditions necessary to prepare stable vitamin and the like containing thixotropic gel preparations, as well as under the alkaline conditions necessary to prepare stable, therapeutic, thixotropic gel preparations containing sulfanilamides and other substances requiring an alkaline medium, which acid and alkaline conditions are outside the pH range at which optimum thixotropy is manifested in like gels which do not contain a thixotropy pH range extender.

By the use of this invention it is possible to add to the thixotropic system of the invention other ingredients compatible with the maintenance of the thixotropic characteristics, which other added ingredients can be included in the system in a higher concentration and more stable form than is ordinarily obtainable in other types of systems. Particularly for therapeutic compositions, there can be included, for example, ingredients for the treatment of metabolic deficiencies as any of the available vitamins or vitamin factors, whether water soluble or oil soluble, or any of the suitable amino acids, proteins, protein hydrolysates, and the like, or antibacterial agents compatible with the system as sulfanilamide and the non-toxic, active sulfanilamide derivatives and other sulfonamides, antibiotics, whether water soluble or not, as penicillin, tyrothricin, streptomycin, and the like, hormones, antacid substances other than those already contained in the major constituent of the system, biologicals as bacterial vaccines, toxoids, virus vaccines, and other therapeutic or pharmaceutical ingredients compatible with the thixotropic system. Examples of thixotropic gels containing these therapeutically active substances are included in the aforesaid application. In most cases the incorporation of these additional pharmaceuticals into the thixotropic gel system of the invention is accomplished by adsorption of the additional agents on the colloidally dispersed, water insoluble, alkaline earth metal salt constituent of the system.

The method for preparing thixotropic gels, described in detail in United States patent application Serial No. 621,382, now United States Patent No. 2,487,600, comprises preparing a concentrated, aqueous dispersion of at least one water insoluble alkaline earth metal salt, advantageously an alkaline earth metal phosphate, carbonate, sulfate or hydroxide. A water soluble citrate of an alkaline base, advantageously an alkali metal base or a nitrogen base, is dissolved in this aqueous concentrate in an amount sufficient to produce the thixotropic character of the system, advantageously between about ½% to not over 5% of citrate based on the weight of the aqueous concentrate.

To develop the thixotropic behavior of such a gel through the neutral point and over to the alkaline side even up to about pH 11, or on the acid side to about pH 3.5, from about as little or even less than 5% up to around 40% of the desired, suitable carbohydrate or hexahydric alcohol is added as the alkalinity or acidity is adjusted to the desired point depending on the desired specifications of the ultimate preparation planned.

The preparation of thixotropic gels having an acid pH and gels having an alkaline pH is illustrated by, but not restricted to, the following examples:

EXAMPLE I.—PREPARATION OF A THIXOTROPIC GEL HAVING A HIGHLY ALKALINE PH

*Solution A*

1200 grams disodium phosphate U. S. P. and
180 grams sodium carbonate monohydrate U. S. P. are dissolved in
12 liters of distilled water at room temperature and filtered.

*Solution B*

880 grams of calcium chloride U. S. P.
78 grams of magnesium chloride cryst. are dissolved in
12 liters of distilled water at room temperature and filtered.

Solution B is added slowly in a thin stream to solution A while stirring the latter. The precipitate is decanted and washed with distilled water until the addition of silver nitrate solution to the wash water shows only traces of chlorine ions.

The precipitate is then filtered, using a Buchner suction filter. The soft mineral cake obtained is put in a bag and concentrated by hydraulic pressure until its total solids content is approximately 25%. This cake had a pH of approximately 6.0 and weighed approximately 2600 grams.

Portions of 200 grams each of this cake were placed into separate mortars and to portion (1), 4 grams of sodium citrate were added and triturated thoroughly. Liquification took place at once and an easily pourable liquid of low viscosity was obtained. This liquid converted into a solid gel after standing for approximately 10 minutes and was reconverted into a low viscosity liquid by stirring or shaking. This procedure could be repeated indefinitely. The pH was 6.1.

A second portion of 200 grams of the mineral cake was converted into a thixotropic gel by the same procedure as described above, and the pH increased to 7 by the addition of a small amount of sodium hydroxide solution. The mixture at once thickened and thixotropy was greatly reduced. Upon stirring or shaking, only a very viscous liquid was obtained which could still be poured. 10 grams (or 5%) of levulose (d-fructose) were added to the mixture. Optimum thixotropic characteristics were restored in the mixture and a readily pourable liquid was obtained. After standing about 10 minutes, the liquid converted to a solid gel, which upon stirring or shaking became a pourable liquid having a low viscosity.

The pH of this sample was gradually increased by adding small portions of sodium hydroxide. Gelling occurred after each addition and more levulose had to be added to restore thixotropy. 40% of levulose was used to maintain optimum thixotropic characteristics when the alkalinity of the gel was adjusted to pH 11.

EXAMPLE II.—PREPARATION OF A THIXOTROPIC GEL HAVING A HIGHLY ACID PH

To a third, 200 gram sample of the mineral cake prepared by the method described in example I, 4 grams of sodium citrate were added and the mixture triturated thoroughly. Liquification took place at once, and a thixotropic gel, having the same properties as described in example I, was obtained. A sufficient amount of citric acid was added to this thixotropic gel to decrease the pH to 4.5. The mixture at once thickened, thixotropy was greatly reduced, and upon shaking, only a very viscous, pourable liquid was obtained. 30 grams (or 15%) of levulose (d-fructose) were added to the mixture. A sol, having good thixotropic characteristics, was again obtained which was converted into a solid gel after standing for about 10 minutes. After shaking, this solid gel was reconverted to an easily pourable liquid of low viscosity.

Additional small portions of citric acid were stirred into the thixotropic gel, and after each addition gelling occurred and more levulose had to be added to restore the thixotropic characteristics desired. 40% of levulose was needed to maintain thixotropy when the acidity of the mixture was adjusted to pH 3.6.

The alkalinity and acidity of additional samples of the thixotropic gel was adjusted as described in Examples I and II and in each instance the addition of from 5% to 40% of any one of the carbohydrates or hexahydric alcohols described above as suitable pH range extenders, the amount depending on the pH of the medium and the pH range extender used, restored the thixotropic characteristics of the gel. The following table shows the percent of the selected pH range extender needed at the most acid pH and most alkaline pH at which it restored optimum thixotropy in the sample tested. It is to be understood, however, that any other carbohydrate or hexahydric alcohol of the type described above as a suitable pH range extender could be used in an amount from about 5% to about 40% in place of any of those specifically recited in the examples or the following table to restore thixotropy under similar acid or alkaline conditions in a gel of the type described in Examples I or II or in the parent Patent No. 2,487,600.

Table

| Mineral cake of Example I—Grams | Type of Citrate | Amount of Citrate | pH Range Extender | Per cent of pH range extender required to maintain optimum thixotropy at about— | |
|---|---|---|---|---|---|
| | | | | pH 3.5 | pH 11.0 |
| | | Grams | | | |
| 200 | Sodium citrate | 4.0 | Glucose | 40 | 30 |
| 200 | Ammonium citrate | 3.6 | Mannose | 35 | 28 |
| 200 | Triethanolamine citrate | 3.8 | Lactose | 38 | 30 |
| 200 | Sodium citrate | 4.5 | Maltose | 35 | 25 |
| 200 | Potassium citrate | 4.0 | Sucrose | 40 | 30 |
| 200 | Sodium citrate | 3.6 | Sorbitol | 35 | 30 |
| 200 | Ammonium citrate | 4.0 | Mannitol | 38 | 35 |
| 200 | Sodium citrate | 3.8 | Dulcitol | 40 | 30 |

While the various specific examples describe the use of certain particular water insoluble, alkali earth metal salts, a certain particular citrate and certain particular pH range extenders in the preparation of the thixotropic compositions, any of these various ingredients may be replaced by any of the respective agents as hereinbefore described and also as illustrated in the specific examples of United States Patent application Serial No. 621,382, now Patent No. 2,487,600.

The improvement of this invention makes available because of the increased pH range over which thixotropy may be manifested, a greatly increased number of thixotropic preparations having substantially the same properties and utility described for them in the parent application identified above.

While the above described invention has been illustrated with respect to certain specific embodiments of it, it is understood modifications, variations, and substitutions may be made in them.

I claim:

1. An aqueous thixotropic gel system comprising an aqueous vehicle, at least one water insoluble alkaline earth metal salt of the group consisting of phosphate, carbonate, sulfate and hydroxide stably suspendably dispersed therein, a water soluble citrate of an alkaline base dissolved in said aqueous vehicle in an amount between ½% but not over 5% to produce the thixotropic character of the system, said alkaline base being a member of the group consisting of the alkaline metal bases and the nitrogen bases, and between 5% and 40% of a pH range extender selected from the class consisting of monosaccharides, di-saccharides and hexahydric alcohols.

2. An aqueous thixotropic gel system comprising an aqueous vehicle, a water insoluble, alkaline earth metal phosphate salt stably suspendably dispersed therein, a water soluble citrate of an alkaline base dissolved in said aqueous vehicle in an amount between ½% but not over 5% to produce the thixotropic character of the system, said alkaline base being a member of the group consisting of the alkali metal bases and the nitrogen bases, and between 5% and 40% of a pH range extender selected from the class consisting of mono-saccharides, di-saccharides and hexahydric alcohols.

3. An aqueous thixotropic gel system comprising an aqueous vehicle, a water insoluble, alkaline earth metal carbonate salt stably suspendably dispersed therein, a water soluble citrate of an alkaline base dissolved in said aqueous vehicle in an amount between ½% but not over 5% to produce the thixotropic character of the system, said alkaline base being a member of the group consisting of the alkali metal bases and the nitrogen bases, and between 5% and 40% of a pH range extender selected from the class consisting of mono-saccharides, di-saccharides and hexahydric alcohols.

HERMAN J. SCHNEIDERWIRTH.

REFERENCES CITED

The following references are of record in the file of this patent:

UNITED STATES PATENTS

| Number | Name | Date |
|---|---|---|
| Re. 21,690 | Bond | Jan. 14, 1941 |
| 1,943,584 | Cross | Jan. 16, 1934 |
| 2,169,983 | Walton | Aug. 15, 1939 |
| 2,277,854 | Lecoq | Mar. 31, 1942 |
| 2,359,413 | Freedman | Oct. 3, 1944 |
| 2,381,621 | Schmelkes et al. | Aug. 7, 1945 |
| 2,384,564 | Roseman | Sept. 11, 1945 |
| 2,405,861 | Tod | Aug. 13, 1947 |
| 2,420,308 | Gates | May 13, 1948 |
| 2,441,729 | Steiner | May 18, 1948 |